US009571692B2

(12) United States Patent
Hama (10) Patent No.: US 9,571,692 B2
(45) Date of Patent: Feb. 14, 2017

(54) IMAGE COMMUNICATION APPARATUS PROVIDING NOTIFICATION FOR START OF TRANSMISSION, CONTROL METHOD THEREFOR AND STORAGE MEDIUM (71) Applicant: CANON KABUSHIKI KAISHA, Tokyo (JP)

(72) Inventor: Mikio Hama, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/666,797

(22) Filed: Mar. 24, 2015

(65) Prior Publication Data
US 2015/0288854 A1    Oct. 8, 2015

(30) Foreign Application Priority Data

Apr. 2, 2014   (JP) .................................. 2014-076177

(51) Int. Cl.
*H04N 1/327*   (2006.01)
(52) U.S. Cl.
CPC ...... *H04N 1/32782* (2013.01); *H04N 1/32726* (2013.01)
(58) Field of Classification Search
CPC .............................. H04N 1/42; H04N 1/32765
USPC ........................ 358/1.15, 405; 709/232, 227
See application file for complete search history.

(56) References Cited

U.S. PATENT DOCUMENTS

| 4,878,242 | A | * | 10/1989 | Springer | ............ | H04N 1/32037 358/434 |
| 2003/0193696 | A1 | * | 10/2003 | Walker | ................ | H04M 7/1245 358/402 |
| 2006/0082835 | A1 | * | 4/2006 | Murai | ................ | H04N 1/00384 358/400 |
| 2013/0050755 | A1 | * | 2/2013 | Nakagawa | ........... | H04N 1/0022 358/1.15 |
| 2013/0208307 | A1 | * | 8/2013 | Oliszewski | ........ | H04N 1/32704 358/1.15 |

FOREIGN PATENT DOCUMENTS

JP         2007336161 A      12/2007

* cited by examiner

*Primary Examiner* — Jamares Q Washington
(74) *Attorney, Agent, or Firm* — Rossi, Kimms & McDowell LLP (57) ABSTRACT An image communication apparatus enables a sender to easily measure timing of pressing down a FAX transmission start button even in the case of manual transmission. When destination information about another image communication apparatus inputted by a user is transmitted to the image communication apparatus via a connected handset, a session for media type "audio" is established between the two to start an in-band transmission by a second communication unit. When receiving the audio signal from another image communication apparatus after establishment of the session, sound generated from the received audio signal is controlled to be output to the handset to urge the user to start FAX transmission, but when receiving an INVITE message with a media type "image" or "application" from another image communication apparatus instead of receiving the audio signal, after the establishment of the session, a notification urging the user to start FAX transmission is made.

9 Claims, 6 Drawing Sheets

STRUCTURE OF INVITE MESSAGE AND SDP

3001 — INVITE sip:user@sample.net SIP/2.0

3002 —
Via: SIP/2.0/UDP sample.net:5060
Max-Forwards:70
From: Alice <sip:alice@sample.net>
To: Bob <sip:bob@sample.net>
Call-ID: 111111@sample.net
Cseq: 1 INVITE
Contact: <sip:Alice@192.168.1.2>
Content-Type: application/sdp
Content-Length: 138

3003

3004 —
v=0
o=Alice 901628708 901628708 IN IP4 sample.net
s=-
t=0 0
m=audio 5004 RTP/AVP 0
a=rtpmap:0 PCMU/8000

3005 —
v=0
o=- 1681503649 1681503649 IN IP4 sample.net
s=-
t=0 0
m=image 9 TCP t38

*FIG. 6*

IMAGE COMMUNICATION APPARATUS PROVIDING NOTIFICATION FOR START OF TRANSMISSION, CONTROL METHOD THEREFOR AND STORAGE MEDIUM

BACKGROUND OF THE INVENTION

Field of the Invention

The present invention relates to an image communication apparatus, a control method therefor and a storage medium, and more particularly, to an image communication apparatus using an image communication technique for performing ITU-T Recommendation T.30 in-band facsimile transfer via a high-speed IP network, a control method therefor and a storage medium.

Description of the Related Art

There are two kinds of methods for FAX transmission using a high-speed IP network, which has been spreading recently. One is a transmission method using ITU-T Recommendation T.38 protocol. It is a method in which a signal transmitted by the T.30 protocol used in conventional G3 FAX is transmitted as a digital signal. The T.38 protocol enables higher-speed transmission in comparison with the T.30 protocol.

The other is an in-band transmission method using the ITU-T Recommendation T.30 protocol. This is a method in which data is modulated to an analog signal by a modem, and the analog signal is encoded by a voice codec, further RTP-packetized by an IP header being attached thereto and transmitted. In the in-band transmission method using the T.30 protocol, analog signal is transmitted being deemed to be an audio signal. The method is also called IP/G3 communication because G3 FAX communication is realized by using an IP network.

In an IP phone, a telephone conversation is realized by encoding a voice to PCM data or the like and transmitting/receiving the PCM data on an IP network. By using this technique, it is possible to realize a telephone conversation with a handset/slave phone (hereinafter referred to as a "handset") of a FAX. By combining the IP/G3 communication and the IP phone, manual transmission by an IP/G3 FAX can be performed.

The manual transmission is a function of performing FAX communication after confirming the situation of a counterpart by a telephone. Basically, a sender makes a conversation directly with the counterpart to be a recipient to mutually confirm an intention of FAX communication with each other, and then the sender starts FAX transmission, and the recipient starts FAX reception. If a recipient apparatus automatically receives FAX, a signal sound made by the recipient apparatus flows through the handset of the sender, thus the sender starts FAX transmission, being triggered thereby.

As a call control means used for the above manual transmission, SIP (Session Initiation Protocol) is used on an IP network, and point-to-point transmission is realized. In the SIP protocol for the call connection, connection is requested by an INVITE message. In the INVITE message, an SDP (Session Descript Protocol) is described. The SDP is a protocol for describing a multimedia session. For example, information about a media type for communication, such as whether a voice is to be communicated ("audio"), an image is to be communicated ("image") or a video is to be communicated ("video"), is described. The media type is used to identify the purpose of communication. In general, the media type is "audio" in the case of IP phone or IP/G3 communication and is "image" or "application" in the case of T.38 communication.

In the case of performing manual transmission by IP/G3 FAX, the sender makes an IP phone call to a recipient apparatus by a handset first. Here, a transmitting apparatus issues an INVITE message with the media type "audio" and connects an audio session with the recipient apparatus. If the recipient apparatus is a machine compatible with IP/G3 FAX and is in an automatic reception mode, the recipient apparatus sends out a FAX signal such as a CED with the media type "audio". The sender confirms a FAX signal sound such as a CED sent out from the recipient apparatus through the handset, and presses a FAX transmission start button to start FAX transmission. If the recipient apparatus is a machine compatible with IP/G3 FAX and it is in a manual reception mode, the recipient responds with a handset. Therefore, after the sender and the recipient confirm an intension of FAX communication with each other through the handset, the sender presses down the FAX transmission start button to start FAX transmission.

In these cases, if both of the transmitting apparatus and recipient apparatus are IP FAXs having a T.38 communication function, it is also possible to re-established a session for the media type "image" and perform T.38 communication. In that case, at the timing of pressing down the FAX transmission start button, the transmitting apparatus issues an INVITE message with the media type "image" to the recipient apparatus and attempt switching to T.38 communication. In any of the cases, the timing of pressing down the FAX transmission start button is measured on the basis of an "audio" FAX signal sound or a voice sent from the recipient after a session is established with the media type "audio" (see, for example, Japanese Laid-Open Patent Publication (Kokai) No. 2007-336161).

However, an IP FAX machine which is not compatible with IP/G3 communication but compatible only with T.38 communication does not send out a FAX signal sound such as a CED with the media type "audio" upon reception of an INVITE message with the media type "audio", and immediately sends out an INVITE message with the media type "image" to re-establish a session and attempt T.38 communication. When performing manual transmission to such a recipient apparatus, a sender cannot hear an "audio" FAX signal sound sent out by the recipient apparatus or the recipient's voice, and there is a problem that the sender cannot measure the timing of starting FAX transmission.

SUMMARY OF THE INVENTION

The present invention has been made in view of the above problem. The present invention provides an image communication apparatus enabling a sender to easily measure the timing of pressing down a FAX transmission start button even in the case of performing manual transmission, a control method therefor and a storage medium.

In a first aspect of the present invention, there is provided an image communication apparatus enabling to connect a handset to realize an IP phone communication, comprising a first communication unit configured to perform transmission of a digital signal, a second communication unit configured to perform in-band transmission where analog signal is transmitted being deemed to be an audio signal, a session establishing unit configured to, when destination information about another image communication apparatus inputted by a user is transmitted via the handset, establish a session for the media type "audio" with the another image communication apparatus to start the in-band transmission by the second communication unit, wherein when receiving the audio signal from the another image communication apparatus after the establishment of the session, a sound generated from the received audio signal is controlled to be output to the handset to urge the user to start FAX transmission, and a notification unit configured to, when receiving an INVITE message with the media type "image" or "application" from the another image communication apparatus, instead of receiving the audio signal, after the establishment of the session, make a notification urging the user to start FAX transmission.

According to the present invention, since the timing of starting FAX transmission is appropriately notified even in the case of performing manual transmission via an IP network, a sender can easily measure the timing of pressing down a FAX transmission start button.

Further features of the present invention will become apparent from the following description of exemplary embodiments (with reference to the attached drawings).

DESCRIPTION OF THE EMBODIMENTS

The present invention will now be described in detail with reference to the drawings showing preferred embodiments thereof. It should be noted that the relative arrangement of the components, the numerical expressions and numerical values set forth in these embodiments do not limit the scope of the present invention unless it is specifically stated otherwise.

Figure 1:
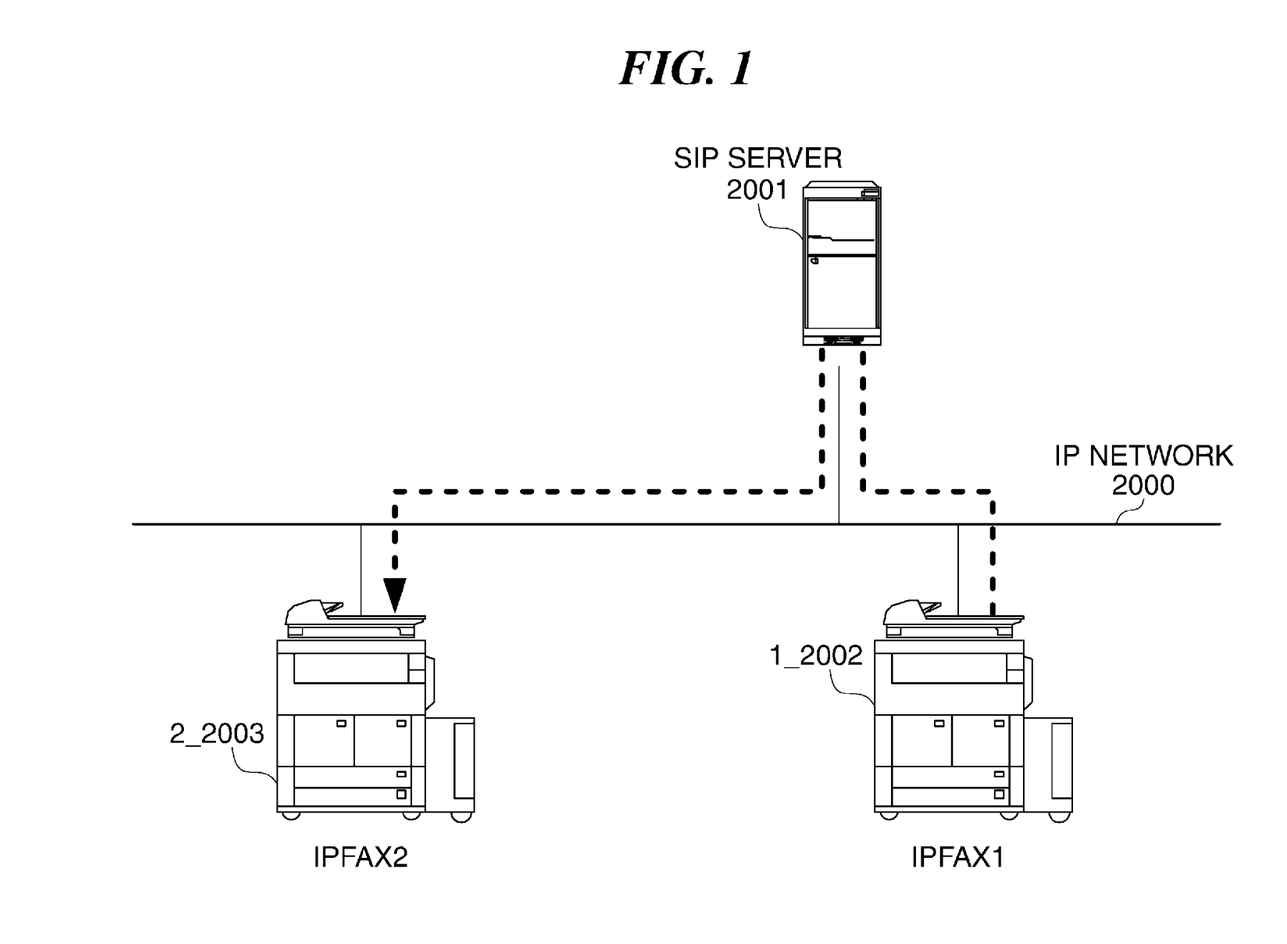
FIG. 1 is a diagram showing an example of a network environment including an IP FAX, which is an image communication apparatus according to an embodiment of the present invention, and another IP FAX.

FIG. 1 is a diagram showing an example of a network environment including an IP FAX, which is an image communication apparatus according to the embodiment of the present invention, and another IP FAX.

In FIG. 1, an IP FAX1_2002 is the image communication apparatus according to the embodiment of the present invention which is connected to an IP network 2000 such as an intranet. This IP FAX1_2002 can communicate with an IP FAX2_2003 via a SIP server 2001 connected to the IP network 2000. The IP FAX2_2003 is the another IP FAX which is almost the same image communication apparatus as the IP FAX1_2002.

Figure 2:
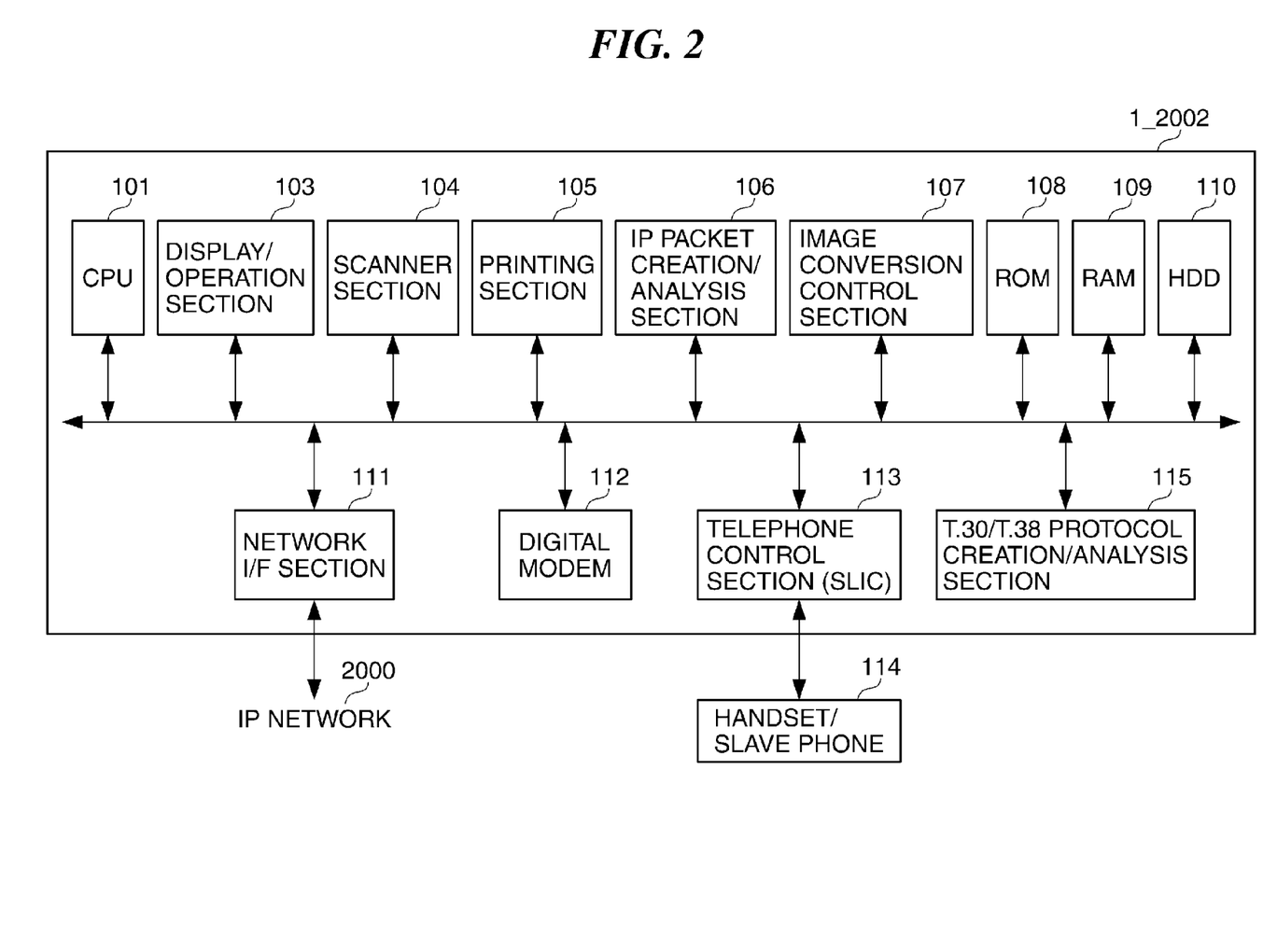
FIG. 2 is a block diagram showing a schematic configuration of the IP FAX in FIG. 1.

FIG. 2 is a block diagram showing a schematic configuration of the IP FAX1_2002 in FIG. 1.

In FIG. 1, the IP FAX1_2002 is provided with each section shown in FIG. 1.

A CPU 101 controls each section in the apparatus on the basis of control programs stored in a ROM 108 and an HDD (hard disk drive) 110.

On a display screen of a display/operation section 103, for example, a window, an icon, a message, a menu and other user interface (UI) information is displayed. The display/operation section 103 is provided with various kinds of keys for a user to perform copy, FAX and printer operations, a FAX transmission start button (not shown) and a screen pointing device (not shown) for operating an icon, a menu and the like on the display screen.

A scanner section 104 reads an original. A printing section 105 prints image data or the like stored in a RAM 109 and the HDD 110. The ROM 108 holds various kinds of control programs and data. The RAM 109 has a work area of the CPU 101, a data save area at the time of error processing, a load area for a control program and the like. The HDD 110 stores various kinds of control programs and print data.

An IP packet creation/analysis section 106 performs mapping of a protocol in conformity with ITU-T Recommendation T.30 or a protocol in conformity with ITU-T Recommendation T.38 on an IP packet. The IP packet creation/analysis section 106 also has a function of taking out a protocol in conformity with ITU-T Recommendation T.30 or a protocol in conformity with ITU-T Recommendation T.38 from a received IP packet.

An image conversion control section 107 performs compression/expansion, magnification change and linear density conversion of an image to be FAX-communicated. A network I/F section 111 is called an NIC (Network Interface Controller), and the IP network 2000 is connected to through this network I/F section 111.

A digital modem 112 is a digital modem for performing modulation/demodulation of a FAX signal. In in-band transmission, a digital signal of transmit data is modulated to an analog signal and further voice-packetized by a voice codec. Otherwise, it is necessary to decode a voice packet of receive data by a voice codec and further demodulate it to a digital signal. Therefore, there is a digital modem internally including a voice codec and capable of performing digital input/output. The digital modem is also capable of analyzing and detecting a FAX signal sound such as a CED from a received voice packet.

An SLIC 113 is an SLIC for performing encoding/decoding of an audio signal to realize an IP phone function, and it has an A/D conversion section, a D/A conversion section and a voice codec for performing encoding/decoding of an audio signal in accordance with a G.711, G.729 or the like. The SLIC 113 is connected to a handset/slave phone 114.

A T.30/T.38 protocol creation/analysis section 115 has a function of generating facsimile transmission information by ITU-T Recommendation T.30/T38 protocol and taking out facsimile transmission information from a received protocol. For example, in the case of performing FAX transmission by IP/G3 communication in an IP network, image data obtained from the scanner section 104 is stored into the RAM 109, then image-converted by the image conversion control section 107, then modulated by the digital modem 112, RTP-packetized by the IP packet creation/analysis section 106, and, after that, sent out to the IP network 2000 by the network I/F section 111.

In the case of performing FAX transmission by T.38 communication, image data obtained by the scanner section 104 is stored into the RAM 109, image-converted by the image conversion control section 107, then converted to a T.30/T.38 protocol by the T.30/T.38 protocol creation/analysis section 115, IP-packetized by the IP packet creation/analysis section 106, and, after that, sent out to the IP network 2000 by the network I/F section 111.

Next, description will be made on a communication sequence at the time of performing manual FAX transmission from the IP FAX1_2002 to the IP FAX2_2003 as the another IP FAX, if the IP FAX2_2003 has the IP/G3 communication function with reference to FIGS. 3 and 4.

Figure 3:
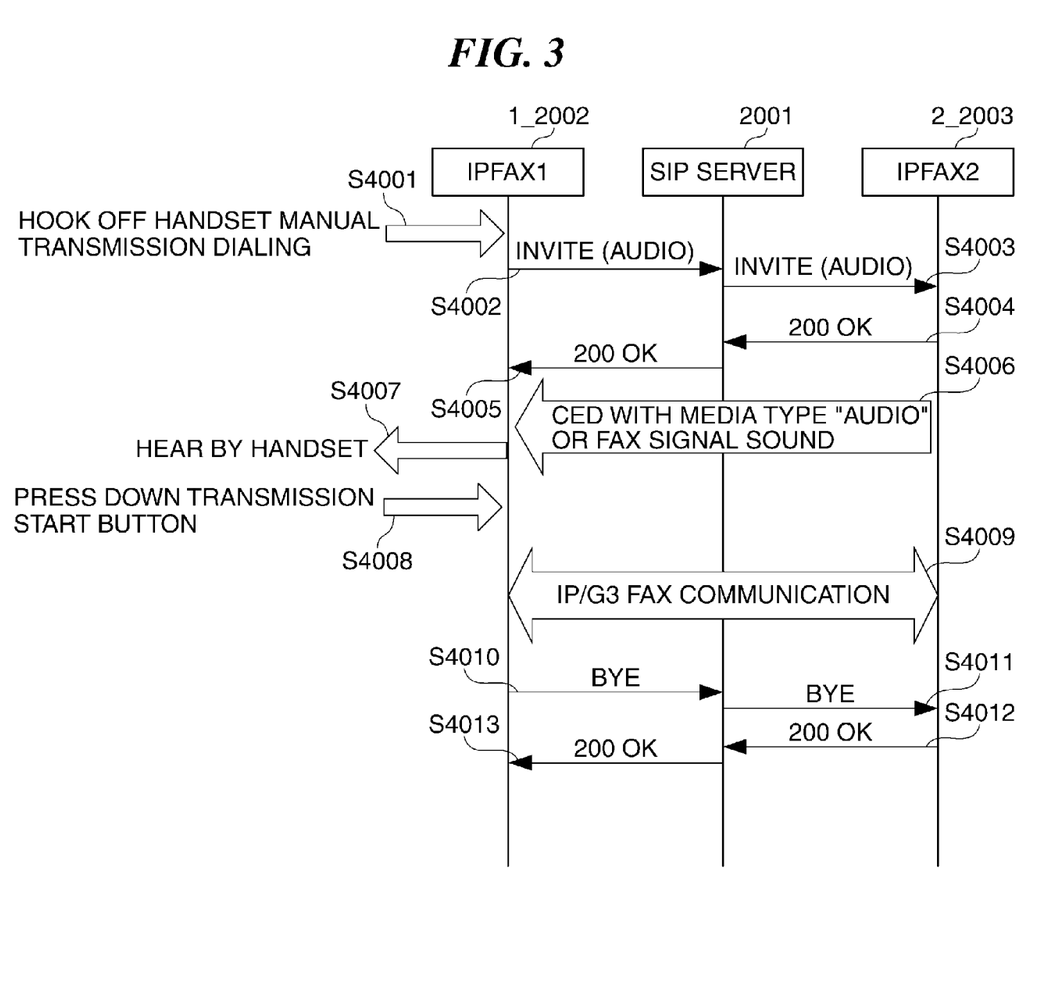
FIG. 3 is a communication sequence diagram at the time of performing manual FAX transmission from the IP FAX in FIG. 1 to the another IP FAX if the another IP FAX has an IP/G3 communication function.

FIG. 3 is a communication sequence diagram at the time of performing manual FAX transmission from the IP FAX1_2002 in FIG. 1 to the IP FAX2_2003 as the another IP FAX, if the IP FAX2_2003 has the IP/G3 communication function.

In FIG. 3, in step S4001, a FAX sender hooks off the handset/slave phone 114 and performs manual transmission dialing.

Next, in step S4002, the IP FAX1_2002 sends out an INVITE message with the media type "audio" to the SIP server 2001 to request session connection. Here, an example of the INVITE message with the media type "audio" and an SDP are shown in FIG. 4.

Figure 4:
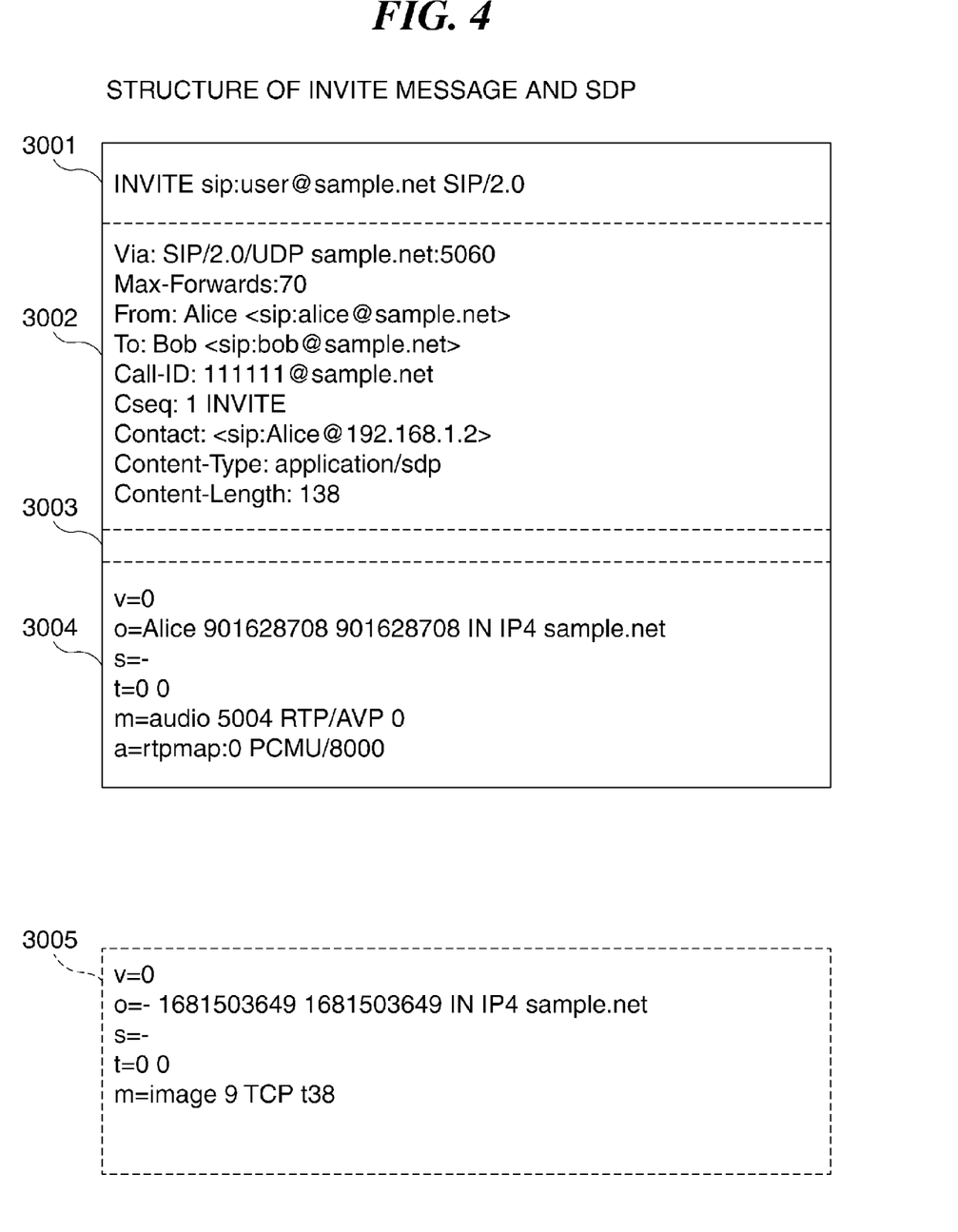
FIG. 4 is a diagram showing an example of an INVITE message with a media type "audio" and an SDP.

In FIG. 4, reference numeral 3001 indicates a start line of a SIP; reference numeral 3002 indicates a header field of the SIP; reference numeral 3003 indicates an empty line; and reference numeral 3004 indicates a body part of the SIP, which is an SDP (Session Descript Protocol). It should be noted that the SDP may be a part indicated by reference numeral 3005.

Since details of each of the fields and lines shown in FIG. 4 are described in Recommendations such as RFC4566, description thereof will be omitted, and description will be made only on the media type of the SDP.

Media type information about a medium for communication can be indicated by a line beginning with "m=" in the SDP (3004 or 3005). For example, in the case of the SDP indicated by reference numeral 3004, since "m=audio" is shown, it is known that the media type is "audio". In the case of the SDP indicated by reference numeral 3005, since "m=image" is shown, it is known that the media type is "image".

Returning to FIG. 3, the SIP server 2001 sends out an INVITE message with the media type "audio" to the IP FAX2_2003 in step S4003. Here, if automatic reception is set for the IP FAX2_2003, the IP FAX2_2003 responds with "200 OK" in step S4004. On the other hand, if manual reception is set for the IP FAX2_2003, the handset of the IP FAX2_2003 sounds. When a recipient hooks off the handset, a "200 OK" response is returned, and a session for the media type "audio" is established.

In step S4005, the SIP server 2001 sends "200 OK" to the IP FAX1_2002.

If the IP FAX2_2003 performs IP/G3 FAX automatic reception in step S4004 described above, the IP FAX2_2003 transmits a FAX signal sound such as an audio CED to the IP FAX1_2002 in step S4006. If the recipient hooks off the handset of the IP FAX2_13 2003 and starts a conversation in step S4004 described above, the recipient's voice is sent to the sender of the IP FAX1_2002.

In any of the above cases, the audio signal sent to the IP FAX1_2002 in step S4006 is decoded to an analog voice by the SLIC 113, and the FAX sender hears the analog voice via the handset/slave phone 114 of the IP FAX1_2002 in step S4007.

In step S4008, the FAX sender of the IP FAX1_2002 judges from the sound he has heard in step S4007 that the IP FAX2_2003 urges FAX reception, and presses down the FAX transmission start button.

In step S4009, the IP FAX1_2002 performs FAX communication with the IP FAX2_2003 by IP/G3 communication. Then, the session is disconnected by a disconnection process in steps S4010, S4011, S4012 and S4013.

In step S4008, after detecting the FAX transmission start button being pressed down, the session may be switched to the media type "image" or "application" to perform T.38 communication. Since switching to T.38 communication is a well-known technique, description thereof will be omitted here.

Next, description will be made on a communication sequence at the time of performing manual FAX transmission from the IP FAX1_2002 to the IP FAX2_2003 as the another IP FAX if the IP FAX2_2003 does not have the IP/G3 communication function, with reference to FIG. 5.

Figure 5:
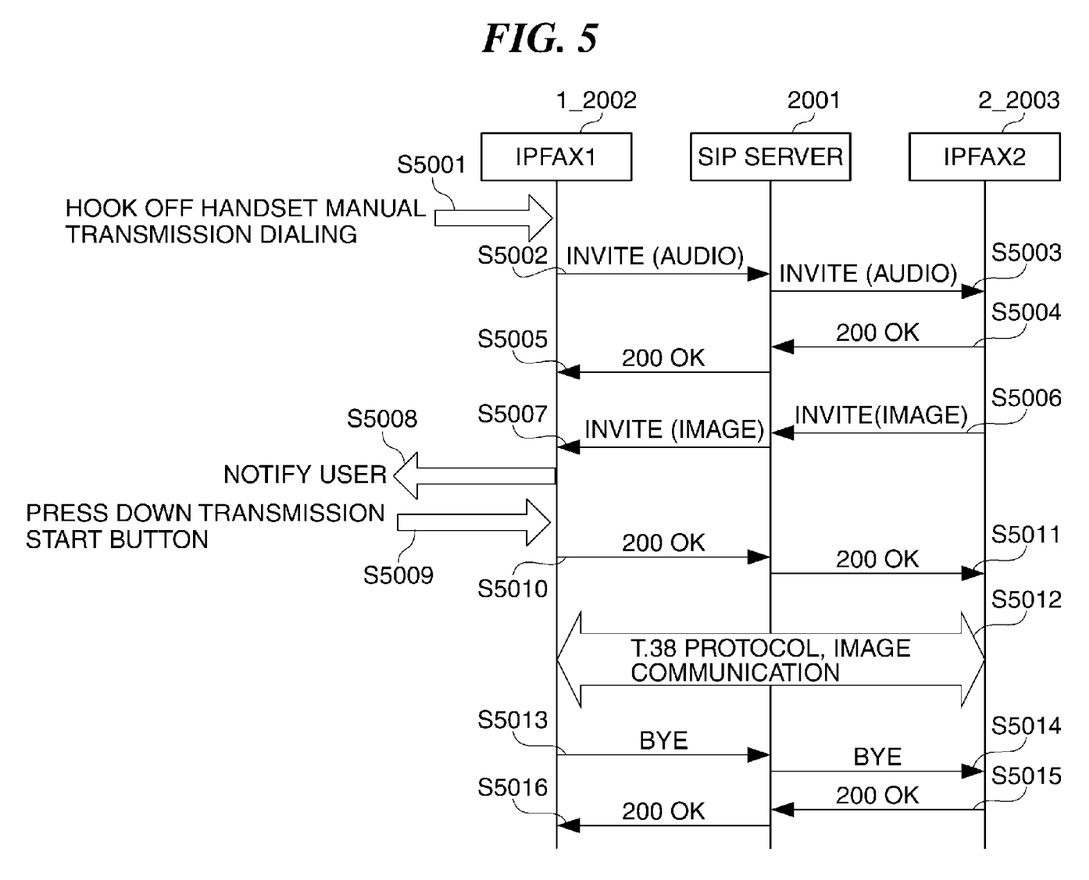
FIG. 5 is a communication sequence diagram at the time of performing manual FAX transmission from the IP FAX in FIG. 1 to the another IP FAX if the another IP FAX does not have the IP/G3 communication function.

FIG. 5 is a communication sequence diagram at the time of performing manual FAX transmission from the IP FAX1_2002 in FIG. 1 to the IP FAX2_2003 as the another IP FAX if the IP FAX2_2003 does not have the IP/G3 communication function. The CPU 101 controls each section in the IP FAX1_2002 to execute the following steps in FIG. 5.

In the case of performing IP FAX communication in an IP network, it is general to pass through a SIP server having routing and registration functions. Depending on the kind of the SIP server, it is required to perform a unique procedure. For example, in the case of a SIP server manufactured by Cisco Systems, Inc., it is necessary to, even in T.38 communication, specify "audio" for the SDP media type of the first INVITE message and, after that, perform a procedure (a procedure unique to Cisco Systems, Inc.) for switching the media type to "image". Therefore, some of IP FAX machines which are not compatible with IP/G3 communication but compatible only with T.38 communication do not send out a FAX signal sound such as a CED with the media type "audio" upon reception of an INVITE message with the media type "audio". Some of them immediately send out an INVITE message with the medium type of "image" to re-establish a session again and attempt T.38 communication.

Thus, in the case where the IP FAX2_2003 has only the T.38 communication function and does not have the IP/G3 communication function, the communication sequence is as shown in FIG. 5.

In FIG. 5, in step S5001, the FAX sender hooks off the handset/slave phone 114 and performs manual transmission dialing.

Next, in step S5002, the IP FAX1_2002 sends out an INVITE message with the media type "audio" to the SIP server 2001 to request session connection.

In step S5003, the SIP server 2001 sends out an INVITE message with the media type "audio" to the IP FAX2_2003.

In step S5004, the IP FAX2_2003 accepts the INVITE message with the media type "audio" and responds with "200 OK" in order to be compatible with a SIP server which does not have the IP/G3 communication function and requests a procedure like that of Cisco Systems, Inc.

In step S5005, the SIP server 2001 sends "200 OK" to the IP FAX1_2002, and a session for the media type "audio" is established.

In step S5006, the IP FAX2_2003 sends out an INVITE message with the media type "image" to immediately re-establish a session for the media type "image". It should be noted that, instead of sending out an INVITE message with the media type "image" as shown in FIG. 5, the IP FAX2_2003 may send out an INVITE message with the media type "application" in step S5006.

In step S5007, the SIP server 2001 relays and sends the INVITE message with the media type "image" to the IP FAX1_2002.

In step S5008, if the IP FAX1_2002 receives the INVITE message with the media type "image", the user holding the handset/slave phone 114 is urged to perform FAX transmission. Specifically, a pseudo CED sound is generated by the SLIC 113 and caused to flow through the handset/slave phone 114. Since this intends to urge the user to perform FAX transmission, it is not necessarily required to cause a pseudo CED sound to flow. A guidance message voice urging FAX transmission may be caused to flow. It is also possible to make a buzzer sound urging FAX transmission by a speaker (not shown) of the transmitting apparatus or display a message urging FAX transmission on a UI screen of the display/operation section 103.

In step S5009, the user presses down the FAX transmission start button. Then, in step S5010, "200 OK" is returned as a response to the INVITE message with the media type "image".

In step S5011, the SIP server 2001 transmits "200 OK" to the IP FAX2_2003.

In step S5012, the IP FAX1_2002 performs FAX communication with the IP FAX2_2003 by T.38 communication. Then, the session is disconnected by a disconnection process in steps S5013, S5014, S5015 and S5016.

Figure 6:
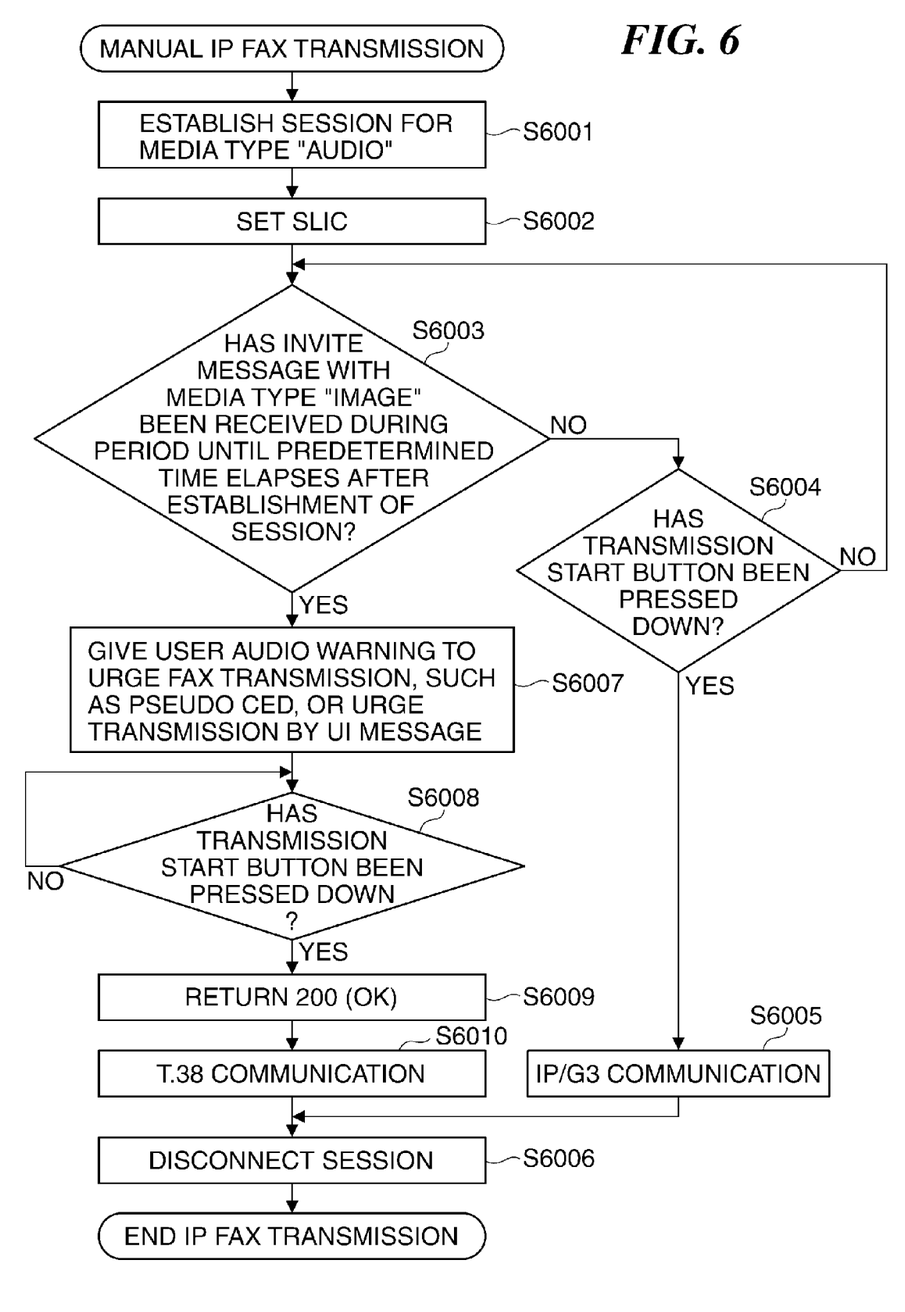
FIG. 6 is a flowchart showing a flow of IP FAX manual transmission by the IP FAX in FIG. 1.

FIG. 6 is a flowchart showing a flow of IP FAX manual transmission by the IP FAX1_2002 in FIG. 1. This process is a flow in the case where the FAX sender of the IP FAX1_2002 hooks off the handset/slave phone 114 and performs manual transmission to the IP FAX2_2003. Further, this process is realized by the CPU 101 executing a control program read out from the ROM 108 or the like. It should be noted that this process is a process where the IP FAX1_2002 does not recognize whether the IP FAX2_2003 has the IP/G3 communication function like the case in FIG. 3 or the IP FAX2_2003 has only the T.38 communication function and does not have the IP/G3 communication function like the case in FIG. 5.

First, in step S6001, when the FAX sender hooks off the handset/slave phone 114 and performs manual transmission dialing as described above (step S4001 in FIG. 3 and step S5001 in FIG. 5), the IP FAX1_2002 sends out an INVITE message with the media type "audio" to the SIP server 2001 (S4002 in FIG. 3 and step S5002 in FIG. 5) and establishes a session for the media type "audio" between the IP FAX1 2002 and the IP FAX2_2003.

Next, in step S6002, the CPU 101 sets the SLIC 113. Thereby, when a FAX signal sound of an IP packet or an audio signal such as a voice is sent from the IP FAX2_2003, the SLIC 113 decodes the audio signal to an analog voice and outputs the decoded analog voice to the handset/slave phone 114. When such an analog voice is outputted to the handset/slave phone 114 from the SLIC 113, the analog voice flows from the handset/slave phone 114 of the IP FAX1_2002 and reaches the FAX sender's ears.

In step S6003, if not having received an INVITE message with the media type "image" from the IP FAX2_2003 during a period until a predetermined time elapses after the establishment of the session in step S6001, the CPU 101 proceeds to step S6004 because the audio session is continuing. On the other hand, if having received an INVITE message with the media type "image" from the IP FAX2_2003, the CPU 101 proceeds to step S6007 because it is presumed that the IP FAX2_2003 is an IP FAX machine compatible only with T.38 communication. It should be noted that, though the media type of the INVITE message the reception of which is judged in step S6003 is "image", the media type may be "application".

If a result of the judgment in step S6003 is NO, the FAX sender confirms whether or not the IP FAX1_2002 is in a state of being able to perform FAX transmission by confirming the audio session described above, specifically, a conversation with the FAX recipient through the handset/slave phone 114 or by confirming a FAX signal sound such as a CED sent from the IP FAX2_2003, and, after the confirmation, presses down the FAX transmission start button.

If the FAX transmission start button is pressed down in step S6004, the CPU 101 proceeds to step S6005. If not, the CPU 101 returns to step S6003.

In step S6005, the CPU 101 performs image transmission by IP/G3 FAX communication. In step S6006, the CPU 101 disconnects the session for the media type "audio" and ends the IP FAX transmission.

In step S6007, the CPU 101 urges the user to perform FAX transmission by generating a pseudo CED sound by the SLIC 113 to flow through the handset/slave phone 114, or causing a guidance message voice urging FAX transmission to flow through the handset/slave phone 114.

When detecting the FAX transmission start button having been pressed down in step S6008, the CPU 101 proceeds to step S6009 and responds to the INVITE message with the media type "image" with "200 OK" to establish a session for the media type "image". It should be noted that, if having received an INVITE message with the media type "application" in step S6003, the CPU 101 responds to the INVITE message with "200 OK" to establish a session for the media type "application".

In step S6010, the CPU 101 performs image transmission by T.38 communication. In step S6006, the CPU 101 disconnects the session for the media type "image" and ends the IP FAX transmission.

It should be noted that, if the CPU 101 does not detect the FAX transmission start button being pressed down for a predetermined time in step S6008, the session for the INVITE message with the media type "image" is time-out and cancelled. The session for the media type "audio" is also disconnected.

According to the embodiment described above, when performing manual transmission to a recipient apparatus (i.e. the IP FAX2_2003), an FAX sender is notified of a FAX transmission start timing if the CPU 101 of a transmitting apparatus receives an INVITE message with a media type "image" or the like while detecting no FAX signal sound or the like from the recipient apparatus after a session for a media type of "audio" is established. Thereby, it is possible to solve a problem that, when the manual transmission is performed, the FAX sender cannot hear an audio FAX signal sound sent out by the recipient apparatus or a FAX recipient's voice, and, therefore, cannot measure a timing of giving an instruction to start FAX transmission. As a result, since the timing of starting FAX transmission is appropriately notified even in the case of performing the manual transmission via an IP network, the FAX sender can easily measure a timing of pressing down a FAX transmission start button.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-076177, filed Apr. 2, 2014, which is hereby incorporated by reference herein in its entirety.

What is claimed is:

1. An image communication apparatus adapted to perform transmission of a digital signal, perform in-band transmission of an audio analog signal, and connect to a handset to provide IP phone communication, comprising:
    a storage device; and
    a processor configured to execute computer executable instructions recorded on the storage device, the computer executable instructions including instructions, that when executed by the processor, cause the image communication apparatus to:
    establish, when destination information about another image communication apparatus inputted by a user is transmitted via the handset, a session for media type "audio" with the another image communication apparatus to start the in-band transmission;
    receive a signal from the another image communication apparatus after the establishment of the session, wherein the received signal is a notification that the another image communication apparatus is ready to receive a facsimile (FAX) transmission;
    output, based on a reception of an audio signal, a sound generated from the received audio signal to the handset; and
    generate, based on a reception of an INVITE message with media type "image" or "application" from the another image communication apparatus, wherein no audio signal is received, an audio notification and output the generated audio notification to the handset,
    wherein the generated audio notification is different from the sound generated from the received audio signal.

2. The image communication apparatus according to claim 1, wherein the computer executable instructions further include instructions, that when executed by the processor, cause the image communication apparatus to:
    detect an instruction by the user to start FAX transmission in response to the INVITE message with the media type "image" or "application"; and
    start communication with the another image communication apparatus.

3. The image communication apparatus according to claim 1, wherein the generated audio notification is a pseudo CED sound to be outputted from the handset.

4. The image communication apparatus according to claim 1, wherein the generated audio notification is a guidance message voice to be outputted from the handset.

5. The image communication apparatus according to claim 1, further comprising a speaker configured to output the generated audio notification.

6. The image communication apparatus according to claim 1, further comprising a display configured to display a message corresponding to the generated audio notification.

7. The image communication apparatus according to claim 1, wherein the computer executable instructions further include instructions, that when executed by the processor, cause the image communication apparatus to determine that the session is continuing if the INVITE message with the media type "image" or "application" is not received during a period until a predetermined time elapses after the establishment of the session.

8. A control method for an image communication apparatus adapted to perform transmission of a digital signal, perform in-band transmission of an audio analog signal, and connect to a handset to provide IP phone communication, the method comprising:
    establishing, when destination information about another image communication apparatus inputted by a user is transmitted via the handset, a session for a media type "audio" with the another image communication apparatus to start the in-band transmission;
    receiving a signal from the another image communication apparatus after the establishment of the session, wherein the received signal is a notification that the another image communication apparatus is ready to receive a facsimile (FAX) transmission;
    outputting, based on a reception of an audio signal, a sound generated from the received audio signal to the handset; and
    generating, based on a reception of an INVITE message with media type "image" or "application" from the another image communication apparatus, wherein no audio signal is received, an audio notification and outputting the generated audio notification to the handset,
    wherein the generated audio notification is different from the sound generated from the received audio signal.

9. A non-transitory computer-readable storage medium having stored therein a program for causing a computer to implement a control method for an image communication apparatus adapted to perform transmission of a digital signal, perform in-band transmission of an audio analog signal, and connect to a handset to provide IP phone communication, the method comprising:
    establishing, when destination information about another image communication apparatus inputted by a user is transmitted via the handset, a session for a media type "audio" with the another image communication apparatus to start the in-band transmission;

receiving a signal from the another image communication apparatus after the establishment of the session, wherein the received signal is a notification that the another image communication apparatus is ready to receive a facsimile (FAX) transmission;

outputting-based on a reception of an audio signal, a sound generated from the received audio signal to the handset; and generating, based on a reception of an INVITE message with media type "image" or "application" from the another image communication apparatus, wherein no audio signal is received, an audio notification and outputting the generated audio notification to the handset, wherein the generated audio notification is different from the sound generated from the received audio signal.

\* \* \* \* \*